US008859662B2

(12) United States Patent
Lamberts et al.

(10) Patent No.: US 8,859,662 B2
(45) Date of Patent: Oct. 14, 2014

(54) POLYAMIDE MOULDING MATERIAL AND USE THEREOF FOR PRODUCTION OF LED HOUSING COMPONENTS

(75) Inventors: Nikolai Lamberts, Bonaduz (CH); Andreas Bayer, Domat/Ems (CH); Manfred Hewel, Domat/Ems (CH); Heinz Hoff, Tamins (CH)

(73) Assignee: EMS-Patent AG, Domat/EMS (CH)

( * ) Notice: Subject to any disclaimer, the term of this patent is extended or adjusted under 35 U.S.C. 154(b) by 236 days.

(21) Appl. No.: 13/096,374

(22) Filed: Apr. 28, 2011

(65) Prior Publication Data

US 2011/0281990 A1 Nov. 17, 2011

(30) Foreign Application Priority Data

May 17, 2010 (EP) .................................. 10 162 998

(51) Int. Cl.
*C08K 3/26* (2006.01)
*C08K 3/22* (2006.01)
*C08K 7/14* (2006.01)

(52) U.S. Cl.
CPC ... *C08K 3/26* (2013.01); *C08K 3/22* (2013.01); *C08K 7/14* (2013.01)
USPC ........................................................ 524/425

(58) Field of Classification Search
CPC ............... C08K 3/22; C08K 3/26; C08K 7/14
USPC ........................................................ 524/425
See application file for complete search history.

(56) References Cited

U.S. PATENT DOCUMENTS 4,698,083 A * 10/1987 Shioura et al. .................. 65/437
2005/0112351 A1* 5/2005 Laney et al. ............... 428/304.4
2006/0293427 A1* 12/2006 Martens et al. ............... 524/404
2006/0293435 A1* 12/2006 Marens et al. ............... 524/497

FOREIGN PATENT DOCUMENTS

EP 0 416 436 A1 3/1991
EP 1 466 944 A1 10/2004
EP 1 693 418 A1 8/2006
EP 1 882 719 A1 1/2008
JP 3-88846 A 4/1991
JP 2007-271834 A2 10/2007
WO 2006/135841 A1 12/2006

* cited by examiner

*Primary Examiner* — Doris Lee
(74) *Attorney, Agent, or Firm* — Sughrue Mion, PLLC

(57) ABSTRACT

What is described is a polyamide molding material based on semicrystalline polyamides for production of LED housings or housing components with high strength, high long-term reflectivity and low blistering tendency. The polyamide moulding material proposed consists of the following components (A) 40 to 80% by weight of at least one semiaromatic polyamide based on at least 70 mol % of aromatic dicarboxylic acids and at least 70 mol % of aliphatic diamines having 4 to 18 carbon atoms and having a melting temperature in the range from 270° C. to 340° C.
(B) 10 to 30% by weight of titanium dioxide particles
(C) 5 to 20% by weight of glass fibres
(D) 5-30% by weight of calcium carbonate.

The percentages by weight of components (A) to (D) together add up to 100%, with the proviso that components (B), (C) and (D) meet the following conditions: (B)+(C)+(D)=20 to 60% by weight; weight ratio of (C)/(D) in the range from 0.25 to 1.5, where the polyamide molding material may optionally comprise customary additives (E) in addition to components (A) to (D), and where the amount thereof is in addition to the sum of components (A) to (D).

20 Claims, No Drawings

POLYAMIDE MOULDING MATERIAL AND USE THEREOF FOR PRODUCTION OF LED HOUSING COMPONENTS

TECHNICAL FIELD

The present invention relates to polyamide moulding materials and to LED housing components produced therefrom, the moulding materials being composed essentially of high-melting polyamides, white pigment, calcium carbonate and glass fibres. The LED components produced on the basis of the polyamide moulding material proposed are notable for a very good long-term reflectivity and good mechanical properties.

STATE OF THE ART

Light-emitting semiconductor diodes (LEDs) are being used to an increasing degree as light sources for numerous applications due to their numerous advantages over traditional incandescent lamps. LEDs are much more economical than customary light sources, require low-voltage current sources, are not shock-sensitive, need virtually no maintenance, and generate a low level of waste heat in operation. Due to these advantages, they are replacing customary incandescent lamps more and more, and are finding uses in light signals, displays (automobile, mobile phone, video, luminous displays), in interior and exterior lighting and in flashlights.

The LED itself in such arrangements is typically merely one component of an overall component composed of several parts. An LED arrangement is composed of at least one semiconductor diode, a housing which accommodates and at least partly surrounds one or more LEDs, and an electrical connection between diode and the connecting element. The component arrangement typically also comprises a lens which is secured to the housing and partly or fully covers the LED and serves to focus the light emitted by the LED.

The manufacture of LED housings by means of injection moulding of polymeric materials enables considerable freedom of design and contributes to cost-effective production. The polymers used, however, must meet a number of properties to be suitable for this application. LEDs are generally soldered to the circuitboards by means of what is called the reflow process (SMT) at temperatures of approx. 260° C. The polymers used should therefore have sufficient heat resistance and withstand reflow soldering without blistering (blister formation on the surface). In addition, the LED housings should have maximum whiteness and good reflectivity in order to be able to reflect the maximum amount of light, over a maximum operating period. This requires, from the polymer compositions, a high UV light stability and heat stability and a good long-term stability under operating conditions.

WO-A-2006/135841 describes housings for an LED arrangement, comprising a high-temperature polyamide composition and a white pigment (titanium dioxide), the parent polyamide having a melting point of greater than 270° C. and, in addition to terephthalic acid, comprising an aliphatic diamine having 10-20 carbon atoms. The moulding materials may optionally also comprise further fillers. In the sole example, glass fibres are used. Addition of glass fibres improves the mechanical properties but worsens the long-term reflectivity dramatically. For instance, WO-A-2006/135841 also discloses only the whiteness index after brief (2 h) heat storage at different temperatures.

JP-A-2007-271834 relates to an LED reflector produced from a high-melting polyamide moulding material consisting of polyphthalamide, inorganic filler, white pigment and an epoxy resin. The description emphasizes especially the good adhesion to epoxides. With regard to the reflectivity, however, only the short-term characteristics (after 2 h at 170° C. or 10 sec at 260° C.) are examined. The sole example describes a PA 6T/66 with 20% glass fibres, 10% titanium dioxide and 3.5-10% epoxy resin. Such compositions have a poor long-term reflectivity.

EP-A-1 693 418 describes a polyamide composition for the production of LED reflectors, comprising polyphthalamides and white pigment, which has a modulus of elasticity in the range from 4500 to 12000 MPa at a temperature of 130° C. In the examples, exclusively glass fibre-reinforced and titanium dioxide-coloured moulding materials based on PA 6T/66 are processed. The glass fibre content is 22 to 30% by weight. The reflectivity is determined after irradiation with a halogen lamp at room temperature for 48 h. However, this arrangement in no way corresponds to the operating conditions, under which a combination of the action of heat and light, as is characteristic in the operation of an LED, comes to bear. These moulding materials too have inadequate long-term reflectivity.

JP-A-03-88846 describes glass fibre-reinforced polyphthalamide moulding materials for the production of housings of electronic components which withstand infrared reflow soldering.

EP-A-1 466 944 describes moulding materials based on semiaromatic polyamides and potassium titanate or wollastonite for the production of LED reflectors. To improve the reflectivity, titanium dioxide was used in addition in some examples. In the comparative examples, the inventive titanates are replaced fully by glass fibres, which distinctly worsens the reflectivity after heat storage (180° C., 2 h). The semiaromatic polyamides employed in the examples were PA 6T/66 and PA 6T/DT.

DESCRIPTION OF THE INVENTION

It is accordingly an object of the invention to provide moulding materials based on semiaromatic polyamides, which are suitable for production of white housing parts for light-emitting diodes (LEDs). The moulding materials should feature high long-term reflectivity, low blistering tendency and good mechanical properties, low warpage and improved processability, especially in injection moulding. High mechanical durability is required in order to prevent fracture of the LED housing in operation or in the event of severe temperature fluctuations. "Long-term reflectivity" in this context means that a high degree of reflectivity is maintained for a maximum period under LED operating conditions, i.e. under the action of heat (120° C.) and light (LED with $\lambda_{max}$=440 nm).

This object is achieved in accordance with the invention by the polyamide moulding materials according to claim 1.

Specifically, the present invention relates to a polyamide moulding material based on semicrystalline polyamides, especially for production of LED housings or housing components with high strength, high long-term reflectivity and low blistering tendency. The inventive polyamide moulding material consists of the following components (A)-(D) in the weight ratios specified:

(A) 40 to 80% by weight of at least one semiaromatic polyamide based on at least 70 mol % of aromatic dicarboxylic acids and at least 70 mol % of aliphatic diamines having 4 to 18 carbon atoms and having a melting temperature ($T_m$) in the range from 270° C. to 340° C.

(B) 10 to 30% by weight of titanium dioxide (C) 5 to 20% by weight of glass fibres (D) 5-30% by weight of calcium carbonate.

These percentages by weight of components (A) to (D) together add up to 100%.

In addition, the above applies with the proviso that components (B), (C) and (D) meet the following conditions:

(B)+(C)+(D)=20 to 60% by weight, weight ratio of (C)/(D) in the range from 0.25 to 1.5.

Polyamide moulding material may optionally comprise customary additives (E) in addition to components (A) to (D), the amount thereof being in addition to the sum of components (A) to (D).

Calcium carbonate may be natural calcium carbonate or precipitated calcium carbonate. It may also comprise surface-treated forms. More particularly, in accordance with DIN EN ISO 3262-4 to -6: 1998-09, it may be chalk (KA type with a $CaCO_3$ content of at least 96%, KB type with at least 90%), calcite (C type with a $CaCO_3$ content of at least 98%) and precipitated calcium carbonate (CCP type with a $CaCO_3$ content of at least 98%). Such products may additionally comprise additives for surface treatment (e.g. stearic acid).

Experiments with white LED housings have shown that polyamide moulding materials filled with calcium carbonate and titanium dioxide give products with good and constant long-term reflectivity. However, a disadvantage is that these purely mineral-filled products give rise to comparatively brittle moulding materials which can be processed only with difficulty. In addition, the mechanical durability is insufficient, and so the LED housings fracture in operation or in the event of severe temperature fluctuations (thermal shock).

The mechanical properties of polyamide moulding materials based on aromatic polyamides, especially on polyphthalamides, and titanium dioxide can be improved by reinforcement with glass fibres. However, the LED housings produced from these glass fibre-reinforced polyamide compositions have a much poorer long-term reflectivity.

It has now been found that, surprisingly, compositions composed of polyphthalamides and titanium dioxide in combination with calcium carbonate and glass fibres can lead to a long-term reflectivity comparable to the purely mineral-filled compositions when the weight ratio of glass fibres to calcium carbonate is selected within a specific range, namely within the range from 0.25 to 1.5. The mechanical durability of these materials is then sufficient to avoid fracture of the LED housings in operation.

Measurement of Long-term Reflectivity:

An important property of the LED housings is a good long-term reflectivity, which means that a high degree of reflectivity must be maintained under operating conditions over a maximum period, in order to ensure high luminance of the LED even in the long term.

The irradiation of specimens (colour tiles) with an LED (15 watts, $\lambda_{max}$=440 nm) at room temperature does not give rise to any visible change in or damage to the material even after 14 days. In other words, pure irradiation is unsuitable for performing a forced stress test of the LED housing materials with regard to the material selection. Only the simultaneous action of heat and irradiation brings about a surface change at the site of irradiation and hence a reduction in the degree of reflectivity.

Therefore, the change in the reflectivity of the specimens manufactured is determined in the stress test described hereinafter. The colour tiles (30×30×2 mm) lying on a flat bed heating table are heated to 120° C. over the whole area from below, and irradiated from above in the middle by an LED (15 watts, $\lambda_{max}$=440 nm) through a focusing lens system (diameter of the core focus 4 mm, diameter of the scattered light circle: 20 mm). The reflectivity is determined after 0 h and after 24 h at a wavelength of 420 and 440 nm. In Tables 1 and 2 below, the difference between these two values is additionally listed as "Δ reflectivity".

The reflectivity is measured to DIN 6174 on colour tiles of dimensions 30×30×2 mm at a temperature of 23° C. with a Datacolor SF600+ spectrophotometer with an aperture of 30 mm.

In a preferred embodiment of the polyamide moulding material according to the invention, the reflectivity of the specimens falls, given a starting value (test time:0 h) of at least 85% measured at 420 nm, by not more than 25% (Δreflectivity), more preferably by not more than 20%, when the samples are exposed as described above to the stress test for 24 h.

Semiaromatic Polyamide (Component (A))

The inventive LED housings are produced from polyamide moulding materials consisting of at least one high-melting polyamide (preferably polyphthalamide), titanium dioxide, glass fibres, calcium carbonate, and stabilizers and further additives.

In a preferred embodiment, the semiaromatic polyamide of component (A) is formed on the basis of at least 80 mol % of aromatic dicarboxylic acids and at least 80 mol % of aliphatic diamines having 4 to 18 carbon atoms, preferably having 6-12 carbon atoms.

A further preferred embodiment is characterized in that the semiaromatic polyamide of component (A), with regard to dicarboxylic acids, is formed essentially exclusively on the basis of aromatic dicarboxylic acids.

In addition, it is preferred that said aromatic dicarboxylic acids of the semiaromatic polyamide of component (A) are selected from the group of: terephthalic acid, isophthalic acid and mixtures thereof.

In a further preferred embodiment, said aliphatic diamines of the semiaromatic polyamide of component (A) are selected from the group of: hexanediamine, decanediamine and mixtures thereof.

The matrix of the polyamide moulding materials used in accordance with the invention is based on at least one high-melting polyamide (component (A)) which has a melting point in the range from 270° C. to 340° C.

The polyphthalamides used with preference are polyamides based on terephthalic acid and aliphatic diamines and optionally further aliphatic, cycloaliphatic and aromatic dicarboxylic acids, and also lactams and/or aminocarboxylic acids.

The high-melting polyamide (component (A)) preferably has a solution viscosity, measured in m-cresol (0.5% by weight, 20° C.), of $\eta_{rel}$ less than 2.6, preferably of $\eta_{rel}$ less than 2.3, especially of $\eta_{rel}$ less than 2.0, and of $\eta_{rel}$ at least 1.4, preferably of $\eta_{rel}$ at least 1.5, especially of $\eta_{rel}$ at least 1.55. The solution viscosity $\eta_{rel}$ is preferably in the range from 1.5 to 2.0, more preferably in the range from 1.55 to 1.75.

A useful high-melting semiaromatic polyamide a polyamide based on aromatic dicarboxylic acids and aliphatic diamines. Some of the aromatic dicarboxylic acids can be replaced by aliphatic and/or cycloaliphatic dicarboxylic acids; some of the aliphatic diamines can be replaced by cycloaliphatic and/or araliphatic diamines. The dicarboxylic acids and the diamines can also be partially replaced by lactams and/or aminocarboxylic acids.

Thus, the high-melting polyamides are formed from the following components:

(A1) dicarboxylic acids:

70-100 mol % of aromatic dicarboxylic acids, preferably terephthalic acid and/or isophthalic acid, based on the total content of acids present, 0-30 mol % of an aliphatic dicarboxylic acid, preferably having 6 to 18 carbon atoms, and/or of a cycloaliphatic dicarboxylic acid having preferably 8 to 20 carbon atoms, (A2) diamines:

70-100 mol % of at least one aliphatic diamine having 4-18 carbon atoms, preferably having 4 to 12 carbon atoms, based on the total content of diamines present, 0-30 mol % of cycloaliphatic diamines, preferably having 6 to 20 carbon atoms, and/or araliphatic diamines, for example MXDA and PXDA, where the percentage molar content of dicarboxylic acids in the high-melting polyamides adds up to 100%, and the percentage molar content of diamines to 100%, and optionally from:

(A3) aminocarboxylic acids and/or lactams comprising 0-100 mol % of lactams having preferably 6 to 12 carbon atoms, and/or 0-100 mol % of aminocarboxylic acids having preferably 6 to 12 carbon atoms.

While components (A1) and (A2) are used in substantially equimolar amounts, the concentration of (A3) is at most 40% by weight, preferably at most 30% by weight, especially at most 20% by weight, based on the sum of (A1) to (A3).

In addition to components A1 and A2 used in substantially equimolar amounts, dicarboxylic acids (A1) or diamines (A2) can be used to regulate the molar mass or to compensate for monomer losses in the polyamide preparation, and so the total concentration of one component A1 or A2 may predominate.

Suitable aliphatic dicarboxylic acids of component A1 are adipic acid, suberic acid, azelaic acid, sebacic acid, undecanedioic acid, dodecanedioic acid, brassylic acid, tetradecanedioic acid, pentadecanedioic acid, hexadecanedioic acid and octadecanedioic acid. Suitable cycloaliphatic dicarboxylic acids are cis- and/or trans-cyclohexane-1,4-dicarboxylic acid and/or cis- and/or trans-cyclohexane-1,3-dicarboxylic acid (CHDA).

The diamines used to an extent of 70-100 mol % as component (A2) are preferably selected from the group of 1,4-butanediamine, 1,5-pentanediamine, 1,6-hexanediamine, 2-methyl-1,5-pentanediamine (MPD), 1,7-heptanediamine, 1,8-octanediamine, 1,9-nonanediamine, 2-methyl-1,8-octanediamine, 2,2,4-trimethylhexamethylenediamine, 2,4,4-trimethylhexamethylenediamine, 5-methyl-1,9-nonanediamine, 1,10-decanediamine, 1,11-undecanediamine, 2-butyl-2-ethyl-1,5 -pentanediamine, 1,12-dodecaneiamine, 1,13-tridecanediamine, 1,14-tetradecanediamine, 1,16-hexadecanediamine, 1,18-octadecanediamine. Among these, preference is given to the diamines 1,6-hexanediamine, 2-methyl-1,5-pentanediamine, 1,9-nonanediamine, 2-methyl-1,8-o ctanediamine, 1,10-decanediamine and 1,12-dodecanediamine, especially 1,6-hexanediamine and 1,10-decanediamine, or mixtures thereof.

The abovementioned aliphatic diamines used obligatorily can be replaced by other diamines in a minor amount of not more than 30 mol %, of preferably not more than 20 mol % and especially not more than 10 mol % (based on the total amount of the diamines). The cycloaliphatic diamines used may, for example, be cyclohexanediamine, 1,3-bis(aminomethyl)cyclohexane (BAC), isophoronediamine, norbornanedimethylamine, 4,4'-diaminodicyclohexylmethane (PACM), 2,2-(4,4'-diaminodicyclohexyl)propane (PACP) and 3,3'-dimethyl-4,4'-diaminodicyclohexylmethane (MACM). Araliphatic diamines include m-xylylenediamine (MXDA) and p-xylylenediamine (PXDA). In addition to the dicarboxylic acids and diamines described, it is also possible to use lactams and/or aminocarboxylic acids as polyamide-forming components (component (A3)). Suitable compounds are, for example, caprolactam (CL), α,ω-aminocaproic acid, α,ω-aminononanoic acid, α,ω-aminoundecanoic acid (AUA), laurolactam (LL) and α,ω-aminododecanoic acid (ADA). The concentration of the aminocarboxylic acids and/or lactams used together with components A1 and A2 is at most 40% by weight, preferably at most 30% by weight and more preferably at most 20% by weight, based on the sum of components A1 and A2. Especially preferred lactams are lactams or α,ω-amino acids having 4, 6, 7, 8, 11 or 12 carbon atoms. These are the lactams pyrrolidin-2-one (4 carbon atoms), ϵ-caprolactam (6 carbon atoms), oenantholactam (7 carbon atoms), caprylolactam (8 carbon atoms), laurolactam (12 carbon atoms), or the α,ω-amino acids 1,4-aminobutanoic acid, 1,6-aminohexanoic acid, 1,7-aminoheptanoic acid, 1,8-aminooctanoic acid, 1,11-aminoundecanoic acid and 1,12-aminododecanoic acid.

Because diamines are more volatile compounds than dicarboxylic acids, the preparation process frequently gives rise to a diamine loss. In other words, in the course of evaporation of the water, in the course of discharge of the precondensate and in the course of postcondensation in the melt or in the solid phase, diamine is lost. To compensate for the diamine loss, preference is therefore given to adding a diamine excess of 1 to 8% by weight based on the total amount of the diamines to the monomer mixture. The diamine excess is also used to regulate the molecular weight and the distribution of the end groups. To regulate the molar mass, the relative viscosity and the free flow or the MVR, regulators in the form of monocarboxylic acids or monoamines can be added to the mixture and/or to the precondensate (before the postcondensation). Aliphatic, cycloaliphatic or aromatic monocarboxylic acids or monoamines suitable as regulators are acetic acid, propionic acid, butyric acid, valeric acid, caproic acid, lauric acid, stearic acid, 2-ethylhexanoic acid, cyclohexanoic acid, benzoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, inter alia. The regulators can be used individually or in combination. It is also possible to use other monofunctional compounds which can react with an amino or acid group as regulators, such as anhydrides, isocyanates, acid halides or esters. The customary use amount of the regulators is between 10 and 200 mmol per kg of polymer.

The semiaromatic copolyamides (A) can be prepared by processes known per se. Suitable processes have been described in various places, and some of the possible processes discussed in the patent literature are to be specified hereinafter; the disclosure content of the documents cited hereinafter is explicitly incorporated into the disclosure content of the present application with regard to the process for preparing the copolyamide of component (A) of the present invention: DE-A-195 13 940, EP-A-0 976 774, EP-A-0 129 195, EP-A-0 129 196, EP-A-0 299 444, U.S. Pat. Nos. 4,831,106, 4,607,073, DE-A-14 95 393 and U.S. Pat. No. 3,454,536.

The most commonly used, and suitable for production of component (A), is the two-stage preparation first of a low-viscosity, low molecular weight precondensate and subsequent postcondensation in the solid phase or the melt (for example in an extruder). Also possible is a three-stage process composed of 1. precondensation, 2. solid phase polymerization and 3. melt polymerization, as specified in DE-A-696 30 260. The process described in this document is explicitly incorporated into the disclosure content of the present application. Also suitable for products with melting points below 300° C. is the one-stage batch process described, for example, in U.S. Pat. Nos. 3,843,611 and 3,839,296, in which the mixture of the monomers or salts thereof is heated to temperatures of 250 to 320° C. for 1 to 16 hours, and the pressure is reduced from a maximum with evaporation of gaseous material, optionally with the aid of an inert gas, to the lowest pressure of down to 1 mm Hg. Specific representatives of the inventive polyamides are: PA 4T/4I, PA 4T/6I, PA 5T/5I, PA 6T/6, PA 6T/6I, PA 6T/10T, PA 6T/10I, PA 9T, PA 10T, PA 12T, PA 10T/10I, PA10T/12, PA10T/11, PA 6T/9T, PA 6T/12T, PA 6T/10T/6I, PA 6T/6I/6, PA 6T/6I/12 and mixtures thereof; the semiaromatic polyamide of component (A) is especially preferably selected from the group of: PA 6T/6I, PA 6T/10T, PA 6T/10T/6I, and mixtures thereof.

According to the invention, preferred high-melting polyamides (A) are especially the following semiaromatic copolyamides:

- semicrystalline polyamide 6T/6I with 50 to 80 mol % of hexamethyleneterephthalamide units and 20 to 50 mol % of hexamethyleneisophthalamide units;
- semicrystalline polyamide 6T/6I with 55 to 75 mol % of hexamethyleneterephthalamide units and 25 to 45 mol % of hexamethyleneisophthalamide units;
- semicrystalline polyamide 6T/6I with 62 to 73 mol % of hexamethyleneterephthalamide units and 25 to 38 mol % of hexamethyleneisophthalamide units;
- semicrystalline polyamide 6T/6I with 70 mol % of hexamethyleneterephthalamide units and 30 mol % of hexamethyleneisophthalamide units;
- semicrystalline polyamide prepared from at least 50 mol % of terephthalic acid and at most 50 mol % of isophthalic acid, and a mixture of at least two diamines selected from the group of hexamethylenediamine, nonanediamine, methyloctanediamine and decanediamine;
- semicrystalline polyamide prepared from at least 70 mol % of terephthalic acid and at most 50 mol % of isophthalic acid, and a mixture of hexamethylenediamine and dodecanediamine;
- semicrystalline polyamide 6T/10T with 10 to 60 mol % of hexamethylene-terephthalamide (6T) and 40 to 90 mol % of decamethyleneterephthalamide (10T) units;
- semicrystalline ternary polyamide 6T/10T/6I with 50 to 90 mol %, preferably 50-70 mol %, of hexamethyleneterephthalamide (6T) and 5 to 45 mol %, preferably 10-30 mol %, of hexamethyleneisophthalamide units (6I) and 5 to 45 mol %, preferably 20-40 mol %, of decamethyleneterephthalamide (10T) units.

Titanium Dioxide (Component (B))

The inventive polyamide moulding material comprises 10 to 30% by weight, preferably 15 to 25% by weight and most preferably 17-23% by weight of titanium dioxide (component B).

The titanium dioxide may either be of the anatase or rutile type, preference being given to the rutile type because of the excellent heat and weathering stability. It is additionally preferred that the titanium dioxide has been surface-treated. Titanium dioxide is incorporated into a multitude of matrix materials as a pigment. In order to meet the different specific demands which are made on the pigment-matrix combination with regard to use and processability in each case, the base material, the pure titanium dioxide, is subjected to a specific aftertreatment process for modification of the particle surface. Preference is given to using inorganic surface treatment agents, especially the combination of inorganic and organic surface treatment agents, for the aftertreatment of titanium dioxide. The titanium dioxide is preferably first coated with an inorganic layer and then provided with an organic coating. Preferred inorganic coatings are metal oxides. The coating of the titanium dioxide primary particles with silicium compounds, aluminium compounds and zirconium compounds, preference being given to the particular metal oxides, and additional organic modification improve a series of use-related properties of the white pigment.

With the inorganic surface treatment, the pigment particles receive a coating of $Al_2O_3$, $ZrO_2$ and $SiO_2$ compounds. This has the object primarily of inhibiting the photocatalytic degradation of the polymer. In order to adapt the pigments for processing into different polymer matrices, they receive a second coating of an organic surface treatment agent, for example carboxylic acids, polyol, alkanolamines and polysiloxanes. The polysiloxane treatment converts the polar surface of the inorganic pigment surface to a less highly polar surface. This promotes the wettability of the pigment particles with the polymer molecules, which leads to good dispersibility. The delivery properties of the pigment are also positively influenced, and the moisture absorption thereof is reduced.

One method of preventing the formation of free radicals and the transport thereof into the polymer matrix is the complete coating of each titanium dioxide particle with a layer of insulating oxides, e.g. silica ($SiO_2$) or alumina ($Al_2O_3$). The most important method employed for stabilization of titanium dioxide with an optimum of optical properties is the doping of the titanium dioxide base material obtained from the chloride process, and inorganic high-performance aftertreatment. The doping of the base material from the chloride process prevents the formation of electron/hole pairs and thus reduces the number of high-energy free radicals. The inorganic coating of such modified titanium dioxide particles consists of specific precipitated silica and/or alumina and a small amount of extraneous elements. These doping agents in the coating react with free radicals present to a low degree and form harmless products. Titanium dioxides stabilized in this way are notable for high greying stability and maximum weathering stability, and are used with preference for the present invention.

The shape of the titanium dioxide particles is not particularly restricted and can appropriately assume the form of flakes or spheres, or an indeterminate form. The average particle diameter of the titanium dioxide particles is preferably about 0.1 to 5 μm, especially 0.2 to 1 μm. The median mass distribution $d50_m$ is preferably in the range from 0.3 to 0.6 μm; the median number distribution $d50_n$ is preferably in the range from 0.1 to 0.4 μm. To improve the dispersibility of the titanium dioxide in the polyamide matrix, it is possible to use silicone oils, polyols or other assistants.

Examples of suitable carboxylic acids as organic coatings are: adipic acid, terephthalic acid, lauric acid, myristic acid, palmitic acid, stearic acid, polyhydroxystearic acid, oleic acid, salicylic acid, hydroxysuccinic acid, maleic acid. The term "carboxylic acid" includes salts, esters and amides of the carboxylic acids mentioned. Examples of silicium compounds which are suitable for the organic coating include:

silicates, organic silanes and organic siloxanes, including organoalkoxysilanes, aminosilanes, epoxysilanes, mercaptosilanes and polyhydroxysiloxanes. Suitable silanes are those with the formula $R_xSi(R')_4$ where R is a nonhydrolysable, aliphatic, cycloaliphatic or aromatic group having 1 to 20 carbon atoms, and R' is one or more hydrolysable groups, for example alkoxy, halogen, acetoxy or hydroxyl group, and x is 1, 2 or 3.

Particularly preferred silanes include hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane , 3-glycidoxypropylmethyldimethoxysilane, 3-mercaptopropyltrimethoxysilane and combinations of two or more thereof. In other silanes which are likewise suitable, R is a radical having 8 to 18 carbon atoms and R' is one or more of the following groups: chloro, methoxy, ethoxy or hydroxyl group.

If present, the proportion by weight of the organic coating is 0.1 to 10%, preferably 0.5 to 7% or most preferably 0.5 to 5%, based on the coated titanium dioxide.

Examples of suitable inorganic coatings include metal oxides and hydroxy oxides of the elements: silicium, aluminium, zirconium, phosphorus, zinc, rare earth metals and others. Preferred metal oxides are aluminium oxide and silicium dioxide. The inorganic coating corresponds approximately to a proportion by weight of 0.25 to 50%, preferably 1.0 to 25% or most preferably 2 to 20%, based on the coated titanium dioxide.

Glass Fibres (Component (C))

A characteristic of the moulding materials described is moderate reinforcement by glass fibres, the glass fibres being used within a concentration range from 5 to not more than 20% by weight, preferably between 7 and 17% by weight and most preferably between 8 and 15% by weight, based on the overall polyamide moulding material.

The glass fibres preferably consist of E glass. However, it is also possible to use all other glass fibre types, for example A, C, D, M, S, R glass fibres, or any desired mixtures thereof or mixtures with E glass fibres. The glass fibres may be added in the form of continuous fibres or in the form of chopped glass fibres, it being possible to provide the fibres with a suitable size system and an adhesion promoter or adhesion promoter system, for example based on silane, aminosilane or epoxysilane. Preference is given to using chopped glass, known as short glass fibres of E or S glass.

Suitable glass fibres are both glass fibres with a circular cross section (round glass fibres) and glass fibres with a noncircular cross section (flat glass fibres).

The round glass fibres have a diameter of 5 to 20 μm, preferably of 5 to 15 μm and more preferably of 7 to 12 μm.

It is also possible with preference to use glass fibres with noncircular cross section (flat glass fibres), especially oval, elliptical, cocoon-like (two or more round glass fibres are bonded longitudinally to one another) or rectangular glass fibres, in the inventive moulding materials. These moulding materials then exhibit advantages with regard to stiffness and strength, especially in transverse direction, in the mouldings produced from the moulding materials. The flat glass fibres used with preference (component (C)) are short glass fibres (chopped glass) with a flat shape and a noncircular cross-sectional area, where the ratio of the mutually perpendicular cross-sectional axes is greater than or equal to 2, and the smaller cross-sectional axis has a length of ≥3 μm. Especially preferred is a glass fibre with a very substantially rectangular cross section. The glass fibres are in the form of chopped glass with a length of 2 to 50 mm. The concentration of the flat glass fibres in the inventive moulding materials is between 5 and 20% by weight, preferably between 7 and 17% by weight, especially between 8 and 15% by weight.

As already detailed above, the flat glass fibres (C) are used in accordance with the invention in the form of chopped glass. These glass fibres have diameters of the small cross-sectional axis of 3 to 20 μm and a diameter of the large cross-sectional axis of 6 to 40 μm, where the ratio of the mutually perpendicular cross-sectional axes (ratio of principal to secondary cross-sectional axis) is between 2 and 6, preferably between 3 and 5 and most preferably about 4.

Calcium Carbonats (Component (D))

A further essential component of the inventive polyamide moulding materials is calcium carbonate (component D), which is present in the moulding material in a proportion by weight of 5-30%, preferably of 10-25% and most preferably of 10 to 20%.

Components B (titanium dioxide), C (glass fibres) and D (calcium carbonate) together make up 20 to 60% by weight of the polyamide moulding material.

The weight ratio of (C):(D)=0.25 to 1.5, preferably 0.3 to 1.2, more preferably 0.4 to 1.0, most preferably 0.5.

Suitable calcium carbonate minerals are both ground natural types and precipitated types (PCC), which preferably have a calcium carbonate content of at least 97% by weight and an $Fe_2O_3$ content of at most 0.2% by weight. In accordance with the forms which occur in nature, a distinction is drawn between chalk, ground calcite, ground marble and ground limestone. Preferred crystal structures are aragonite and calcite, preference being given to acicular, cigar-shaped and cubic crystal forms. Especially preferred is the cigar-shaped crystal form, as possessed, for example, by the products Socal P2 or P3 from Solvay Chemicals. Examples of ground natural chalks are: Hydrocarb, Setacarb-OG (ultrafine), Calcigloss-GU (ultrafine ground marble) from Plüss-Staufer AG.

The natural calcium carbonate fillers are available in a range of graduated grinding finenesses. This graduation ranges from ultrafine products with $d50_m$ values of approx. 1 μm and upper particle size of 6 to 10 μm as far as spall forms in the mm range with narrow particle size distributions. Specific surface areas are between 1 and 10 $m^2/g$, though 10 $m^2/g$ is obtained only when the grinding is at its finest. In the case of the PCC types, the fine types have specific surface areas of 6-10 $m^2/g$, and the ultrafine types specific surface areas of 20-35 $m^2/g$.

To improve the dispersion of the calcium carbonates in thermoplastics, lipophilic character can be imparted to the calcium carbonate by suitable surface treatment (coating). Suitable agents for surface treatment are, for example, calcium stearate and stearic acid, and the carboxylic acids already mentioned for the organic surface treatment of titanium dioxide.

LED Housing/housing

The term “LED arrangement” refers to a component consisting of at least one light-emitting semiconductor diode, an electrical connection for connection of the diode to the current source, and the housing which partially surrounds the diode. Optionally, this LED arrangement may also include a lens which fully or partly covers the LED and serves to focus the light emitted.

The polymers used should therefore have a sufficient heat resistance and withstand reflow soldering without blistering (surface blister formation). In addition, the LED housings should have maximum whiteness and good reflectivity in order to be able to reflect the maximum amount of light, over a maximum operating period. This requires, from the polymer compositions, high UV light stability and heat stability, and good long-term stability under operating conditions. The inventive polyamide moulding materials meet all requirements mentioned, and are notable especially for a very good long-term reflectivity. The housing of this LED arrangement can be manufactured from a single piece or from two or more individual pieces. The entire housing or at least one housing part is manufactured from the inventive moulding material. The remaining housing parts can then be produced from other polymeric or ceramic materials. The individual housing parts can be mechanically bonded to one another or adhesive-bonded to one another, or combined to form a unit by overmoulding with a thermoplastic moulding material, for example the inventive polyamide moulding material. Housings or housing parts are produced from the inventive moulding materials by means of known thermoplastic shaping processes, for example injection moulding. Housings or housing parts can also be produced by overmoulding, with the polyamide moulding material, a metallic leadframe (preferably copper or silver-plated copper) which establishes the electrical connection to the LED in the housing.

The housings preferably have a depression (cavity) within a defined region, into which the LED is inserted, and which serves as a reflector for the light emitted by the LED in the direction of the exit orifice provided or of the mounted lens. The depression has a cylindrical, conical or parabolic form or any curved form and preferably has a smooth surface. The walls of the depression are preferably aligned parallel or essentially parallel to the diode. The optional lens is arranged above the LED depression and consists, for example, of an epoxy resin or silicone resin, or a crosslinked transparent polyamide.

The inventive housings or housing parts are incorporated into LED arrangements which are used, for example, in the following applications: traffic lights, video displays, visual display units, interior and exterior lighting, displays for mobile phones, floodlights, brake lights and reversing lights in vehicles, backlighting for TV, computer, laptop or notebook displays, floor lighting, for example for paths, flashlights.

Further embodiments are specified in the dependent claims.

DESCRIPTION OF PREFERRED EMBODIMENTS

The invention will be explained and supported further hereinafter with reference to working examples. The working examples discussed hereinafter serve merely for the purpose of illustration and support of the invention, and they should not be used to interpret the invention in a restrictive manner as described in general terms above, and defined in the claims.

In the examples, the following starting materials are used for production of inventive moulding materials:

Component (A):

Polymer 1: Polyamide 6T/6I (70:30) with a melting point of 325° C. and a solution viscosity of $\eta_{rel}$=1.59 (in m-cresol, 0.5% by weight, 20° C.).

Polymer 2: Polyamide 6T/10T (15:85) with a melting point of 295° C. and a solution viscosity of $_{Orel}$=1.68 (in m-cresol, 0.5% by weight, 20° C.).

Component (B):

Titanium dioxide type A: Ti-Pure R-104 (DuPont)

Titanium dioxide type B: Kronos 2222 (Kronos Inc.)

Component (C):

Glass fibres 1 Vetrotex 995; round standard glass fibres with circular cross section for polyamides, fibre length 4.5 mm, diameter 10 μm;

Glass fibres 2 NITTOBO CSG3PA-820, flat glass fibres, length 3 mm, principal cross-sectional axes approx. 7 and 28 μm, ratio of the cross-sectional axes accordingly approx. 4, aminosilane size, NITTO BOSEKI, Japan.

Component (D):

Socal P3 (Solvay)

Production of the moulding materials and processing thereof:

The starting materials are compounded in the amounts listed in Tables 1 and 2, each reported in % by weight, by means of a Werner & Pfleiderer ZSK25 twin-screw extruder to give the corresponding moulding materials. Components A, B and D are conveyed into the intake zone of the extruder by means of metering balances. The glass fibres (component B) and optionally a portion of component D are supplied via a side feeder. The components were homogenized at temperatures of 300-340° C. The moulding materials were discharged as a strand, cooled in a waterbath and then pelletized. The pellets were dried to a moisture content of <0.05% and processed on an injection moulding machine (barrel temperature: 330° C., mould temperature: 130° C.) to give test specimens.

The following tests were carried out according to the following standards and on the following test specimens.

Tensile modulus of elasticity, ultimate tensile strength and tensile strain at break: ISO 527 with a pulling speed of 5 mm/min ISO tensile specimen, standard: ISO/CD 3167, A1 type, 170×20/10×4 mm, temperature 23° C.

Thermal characteristics: melting point:

ISO standard 11357-11-2; pellets; The differential scanning calorimetry (DSC) was conducted with a heating rate of 20° C./min.

Relative Viscosity:

DIN EN ISO 307, in 0.5% by weight m-cresol solution, pellet temperature 20° C.

Long-term Reflectivity:

The colour tiles (30×30×2 mm) lying on a flat-bed heating table are heated to 120° C. over the whole area from below in an air atmosphere, and irradiated from above in the middle by an LED (15 watts, $\lambda_m$=440 nm) through a focusing lens system (diameter of the core focus: 4 mm, diameter of the scattered light circle: 20 mm). The reflectivity is determined at the wavelength of 420 and 440 nm after 0 h and after 24 h.

The reflectivity is measured to DIN 6174 on colour tiles of dimensions 30×30×2 mm at a temperature of 23° C. with a Datacolor SF600+ spectrophotometer with an aperture of 30 mm.

Mechanical Stability in a Thermal Cycling Test:

In each case 100 LED housings injection-moulded onto leadframes are heated to 150° C. in an oven heated to 150° C. (forced air) for 3 minutes. Then the samples are transferred within 3 seconds to a cooling box at a temperature of −60° C., stored therein for 3 minutes, before they are returned to the oven heated to 150° C. within 3 seconds. This cycle is executed 50 times. If more than one per cent of the LED housings suffer crack formation during this thermal cycling test, the test has been failed. In the tables, this is indicated by a "C" for crack formation, while "NC" stands for no crack formation.

Discussion of the Results:

The final properties of the samples from the different Examples according to the invention 1-8, and Comparative Examples 1-8, are summarized in Tables 1 and 2.

All of the specimens manufactured from the inventive moulding materials achieve equally good starting values for the reflectivity measured at a wavelength of 420 and 440 nm, like their comparative variants. After storage at 120° C. for 24 h and simultaneous intense irradiation with an LED light source, the reflectivity for the inventive moulding materials declines much less than is the case for the comparative examples. More particularly, the specimens based on the type 1 polymer maintain their high degree of reflectivity even after prolonged heating and irradiation, and are accordingly very suitable for the production of LED housings or housing parts.

The LED housings from comparative example 2, which were not reinforced with glass fibres, exhibit satisfactory long-term reflectivity but are very brittle, are difficult to process and have inadequate mechanical stability, which leads to cracking in the thermal cycling test.

Comparative Examples 7 and 8 comprise, like the inventive examples, as well as titanium dioxide, also components C (glass fibres) and D (calcium carbonate), but not in the inventive ratio of 0.25 to 1.5. In Comparative Example 7, the weight-based ratio of glass fibres to calcium carbonate is 2.0. Compared to Example 1, the long-term reflectivity is much lower. In Comparative Example 8, the weight-based ratio of glass fibres to calcium carbonate is 0.20. Here, the long-term reflectivity is comparable to Example 1, but the LED housings produced with this moulding material suffer crack formation in the thermal cycling test after only a few cycles. In other words, the mechanical stability of these LED housings is inadequate.

TABLE 1

Composition and properties of Examples 1 to 8

| Example | 1 | 2 | 3 | 4 | 5 | 6 | 7 | 8 |
|---|---|---|---|---|---|---|---|---|
| Composition in % by wt. | | | | | | | | |
| Polymer 1 (HT1) | 58.6 | 48.0 | 48.0 | | | | 48.0 | 48.0 |
| Polymer 2 (HT3) | | | | 58.6 | 53.0 | 48.0 | | |
| Glass fibres 1 (round) | 10.0 | 10.0 | 10.0 | 15.0 | 15.0 | 15.0 | | |
| Glass fibres 2 (flat) | | | | | | | 10.0 | 15.0 |
| Titanium dioxide A | 20.0 | 20.0 | | | 20.00 | | | |
| Titanium dioxide B | | | 20.0 | 20.0 | | 20.0 | 20.0 | 20.0 |
| Calcium carbonate | 10.0 | 20.0 | 20.0 | 10.0 | 10.0 | 15.0 | 20.0 | 15.0 |
| Stabilization/processing aids | 1.4 | 2.0 | 2.0 | 1.4 | 2.0 | 2.0 | 2.0 | 2.0 |
| Properties | | | | | | | | |
| Ultimate tensile strength [MPa] | 100 | 110 | 95 | 90 | 85 | 90 | 100 | 110 |
| Tensile strain at break [%] | 1.8 | 1.6 | 1.9 | 2 | 2 | 1.5 | 2.1 | 2.0 |
| Tensile modulus of elasticity [MPa] | 6500 | 7500 | 7000 | 7500 | 6000 | 8000 | 7500 | 8500 |
| Reflectivity (0 h) 420 nm (%) | 87 | 87 | 85 | 87 | 85 | 85 | 87 | 86 |
| Reflectivity (24 h) 420 nm (%) | 67 | 75 | 80 | 77 | 65 | 66 | 81 | 82 |
| Δ Reflectivity 420 nm (%) | 20 | 12 | 5 | 10 | 20 | 19 | 6 | 4 |
| Reflectivity (0 h) 440 nm (%) | 90 | 90 | 88 | 91 | 88 | 88 | 88 | 90 |
| Reflectivity (24 h) 440 nm (%) | 68 | 78 | 83 | 80 | 67 | 68 | 82 | 84 |
| Δ Reflectivity 440 nm (%) | 22 | 22 | 5 | 11 | 21 | 20 | 6 | 6 |
| Stability in the thermal cycling test | NC | NC | NC | NC | NC | NC | NC | NC |

TABLE 2

Composition and properties of Comparative Examples 1 to 8

| Comparative example | 1 | 2 | 3 | 4 | 5 | 6 | 7 | 8 |
|---|---|---|---|---|---|---|---|---|
| Composition in % by wt. | | | | | | | | |
| Polymer 1 (HT1) | 58.6 | 58.6 | 58.6 | 58.6 | | | 48.6 | 48.6 |
| Polymer 2 (HT3) | | | | | 58.6 | 58.0 | | |
| Glass fibres | 20.0 | | 20.0 | 20.0 | 20.0 | 20.0 | 20.0 | 5.0 |
| Titanium dioxide A | 20.0 | | | | 20.0 | | 20.0 | 20.0 |
| Titanium dioxide B | | 20.0 | | 20.0 | | | | |
| Calcium carbonate | | 20.0 | 20.0 | | | 20.0 | 10.0 | 25.0 |
| Stabilization/processing aids | 1.4 | 1.4 | 1.4 | 1.4 | 1.4 | 2.0 | 1.4 | 1.4 |
| Properties | | | | | | | | |
| Ultimate tensile strength [MPa] | 120 | 60 | 65 | 120 | 110 | 60 | 100 | 70 |
| Tensile strain at break [%] | 1.6 | 1.2 | 1.5 | 1.7 | 1.6 | 1.6 | 1.5 | 1.3 |
| Tensile modulus of elasticity [MPa] | 8500 | 6000 | 5000 | 8500 | 8000 | 4500 | 8600 | 6200 |
| Reflectivity (0 h) 420 nm (%) | 88 | 89 | 86 | 85 | 88 | 88 | 87 | 89 |
| Reflectivity (24 h) 420 nm (%) | 39 | 68 | 60 | 51 | 46 | 60 | 52 | 67 |
| Δ Reflectivity 420 nm (%) | 49 | 21 | 26 | 34 | 42 | 28 | 35 | 22 |
| Reflectivity (0 h) 440 nm (%) | 92 | 90 | 95 | 90 | 91 | 96 | 89 | 91 |
| Reflectivity (24 h) 440 nm (%) | 41 | 76 | 62 | 54 | 48 | 63 | 52 | 65 |
| Δ Reflectivity 440 nm (%) | 51 | 24 | 33 | 36 | 43 | 33 | 37 | 26 |
| Stability in the thermal cycling test | NC | C | NC | NC | NC | NC | NC | C |

The invention claimed is:

1. A polyamide moulding material based on semicrystalline polyamides for production of LED housings or housing components with high strength, high long-term reflectivity and low blistering tendency, consisting of (A) 40 to 68% by weight of at least one semiaromatic polyamide based on at least 70 mol % of aromatic dicarboxylic acids and at least 70 mol % of aliphatic diamines having 4 to 18 carbon atoms and having a melting temperature ($T_m$) in the range from 270° C. to 340° C., (B) 15-25% by weight of titanium dioxide particles, (C) 7-17% by weight of glass fibres which have a round or noncircular cross-sectional area, or a mixture of such glass fibres, and (D) 10-25% by weight of calcium carbonate, where the percentages by weight of components (A) to (D) together add up to 100%, and with the proviso that components (B), (C) and (D) meet the following conditions:

B)+(C)+D)=20 to 60% by weight, weight ratio of (C)/(D) is in the range from 0.3 to 1.5, and where the polyamide moulding material optionally comprises customary additives (E) in addition to components (A) to (D), and where the amount thereof is in addition to the sum of components (A) to (D).

2. The polyamide moulding material according to claim 1, wherein component (B) comprises organically or inorganically coated titanium dioxide particles.

3. The polyamide moulding material according to claim 1, wherein the average particle diameter of the titanium dioxide particles is 0.1 to 5 μm.

4. The polyamide moulding material according claim 1, wherein the weight ratio (C)/(D) is in the range from 0.3 to 1.2.

5. The polyamide moulding material according to claim 1, wherein the semiaromatic polyamide of component (A) is formed on the basis of at least 80 mol% of aromatic dicarboxylic acids and at least 80 mol% of aliphatic diamines having 4 to 18 carbon atoms.

6. The polyamide moulding material according to claim 1, wherein the semiaromatic polyamide of component (A), with regard to dicarboxylic acids, is formed essentially exclusively on the basis of aromatic dicarboxylic acids.

7. The polyamide moulding material according to claim 1, wherein said aromatic dicarboxylic acids of the semiaromatic polyamide of component (A) are selected from the group of: terephthalic acid, isophthalic acid and mixtures thereof.

8. The polyamide moulding material according to any of to claim 1, wherein said aliphatic diamines of the semiaromatic polyamide of component (A) are selected from the group consisting of: hexanediamine, decanediamine and mixtures thereof.

9. The polyamide moulding material according claim 1, wherein the semiaromatic polyamide of component (A) is selected from the group consisting of: PA 4T/4I, PA 4T/6I, PA 5T/5I, PA 6T/6, PA 6T/6I, PA 6T/10T, PA 6T/10I, PA 9T, PA 10T, PA 12T,PA 10T/10I, PA10T/12, PA10T/11, PA 6T/9T, PA 6T/12T, PA 6T/10T/6I, PA 6T/6I/6, PA 6T/6I/12, and mixtures thereof.

10. The polyamide moulding material according to claim 1, wherein component (D) is formed by 10 to 20% by weight, of calcium carbonate.

11. The polyamide moulding material according to claim 1, wherein the average particle diameter of the titanium dioxide particles is 0.2 to 1 μm.

12. The polyamide moulding material according to claim 1, wherein the median mass distribution $d50_m$ of the titanium dioxide particles is in the range from 0.3 to 0.6 μm.

13. The polyamide moulding material according to claim 1, wherein the median number distribution $d50_n$ of the titanium dioxide particles is in the range from 0.1 to 0.4 μm.

14. The polyamide moulding material according to claim 1, wherein the weight ratio (C)/(D) is in the range from 0.4 to 1.0.

15. The polyamide moulding material according to claim 1, wherein component (C) is formed by 8-15%, by weight of glass fibres which have a round or noncircular cross-sectional area, or a mixture of such glass fibres is used.

16. The polyamide moulding material according to claim 1, wherein component (C) is formed by 8-15%, by weight of glass fibres which have a noncircular cross-sectional area, or a mixture of such glass fibres is used, said cross-sectional area being oval, elliptical, rectangular or cocoon-shaped.

17. The polyamide moulding material according to claim 1, wherein the semiaromatic polyamide of component (A) is formed on the basis of at least 80 mol% of aromatic dicarboxylic acids and at least 80 mol% of aliphatic diamines having 6-12 carbon atoms.

18. The polyamide moulding material according to claim 1, wherein the semiaromatic polyamide of component (A) is selected from the group consisting of: PA 6T/6I, PA 6T/10T, PA 6T/10T/6I, and mixtures thereof.

19. A LED housing or LED housing component formed from a polyamide moulding material according to claim 1.

20. A process of using a polyamide moulding material according to claim 1, said process comprising producing an LED housing or an LED housing component.

* * * * *